UNITED STATES PATENT OFFICE.

CASPAR B. SHAFER, OF WASHINGTON, DISTRICT OF COLUMBIA.

MEDICATED EFFERVESCENT SALTS.

SPECIFICATION forming part of Letters Patent No. 287,781, dated October 30, 1883.

Application filed September 19, 1883. (No specimens.)

*To all whom it may concern:*

Be it known that I, CASPAR B. SHAFER, a citizen of the United States, residing at Washington, in the District of Columbia, have invented a new and useful Improvement to the class known as Medicated Effervescent Salts, of which the following is a specification.

My improvement consists in taking the mass obtained from natural mineral water by evaporation, adding to the dry mass sufficient powdered acid and alkali to produce effervescence, and, where possible, a clear solution with agreeable flavor when the compound is ready to be added to water in sufficient proportions, as from one-half to one tea-spoonful to a goblet of water.

It has now become common to evaporate natural waters at a low temperature in shallow pans, and thus concentrate them in the same manner that salt is evaporated. The mineral product thus obtained is termed "mass."

The effervescent mass of Saratoga Vichy spring is made in the following manner: Thus, I take of powdered Saratoga Vichy mass three hundred and sixty grains; citric acid, sixteen hundred and twenty grains; bicarbonate of soda, eighteen hundred grains. Other acids or acid salts—as cream-tartar or other alkaline carbonate—may be used. The above proportions may be varied, and sugar or other flavoring may be added. This may be prepared in granular form and permanent in the air by mixing the materials, each separately well-dried, with sufficient strong alcohol to reduce to a moist condition, passing it through a somewhat coarse sieve and thoroughly drying it. If desired, a little oil of lemon may be dissolved in the alcohol. A mixture thus prepared effervesces, upon the addition of water, to the last crumb. The granulation may be performed by other practiced methods. The mass of other waters may be prepared in like manner—as, for instance, Vichy, Hunyadi János, Carlsbad, Deep Rock, Mountain Valley, Congress, Crab Orchard, &c.

I am aware that mass has been made from natural water. I am also aware that effervescent medicated salts have been made by uniting artificially-prepared salts in the proportions found by analysis to exist in the mineral waters, thus imitating the natural with artificial productions, and objectionable for the same reason which causes natural waters to be preferred to the factitious; but I am not aware that effervescent medicated mass has ever been produced from the natural mass, or in the manner here described.

What I claim, and desire to secure by Letters Patent of the United States, is—

1. The process of preparing effervescent natural mass, which consists in evaporating natural water until the salts therein contained are reduced to a dry powder, and then incorporating with the dry mass an acid or acid salt and a suitable alkaline carbonate or bicarbonate.

2. Effervescent natural mass, substantially as set forth.

3. Effervescent natural mass, being the powder produced by evaporation of medicinal or mineral waters, having incorporated therewith an acid or acid salt and an alkaline carbonate or bicarbonate.

CASPAR B. SHAFER.

Witnesses:
J. FRANK MELTON,
F. L. HOOD.